Nov 1, 1949.　　　　G. N. HOWATT　　　　2,486,410
CONTINUOUS PROCESS FOR FORMING
HIGH DIELECTRIC CERAMIC PLATES
Filed July 26, 1945
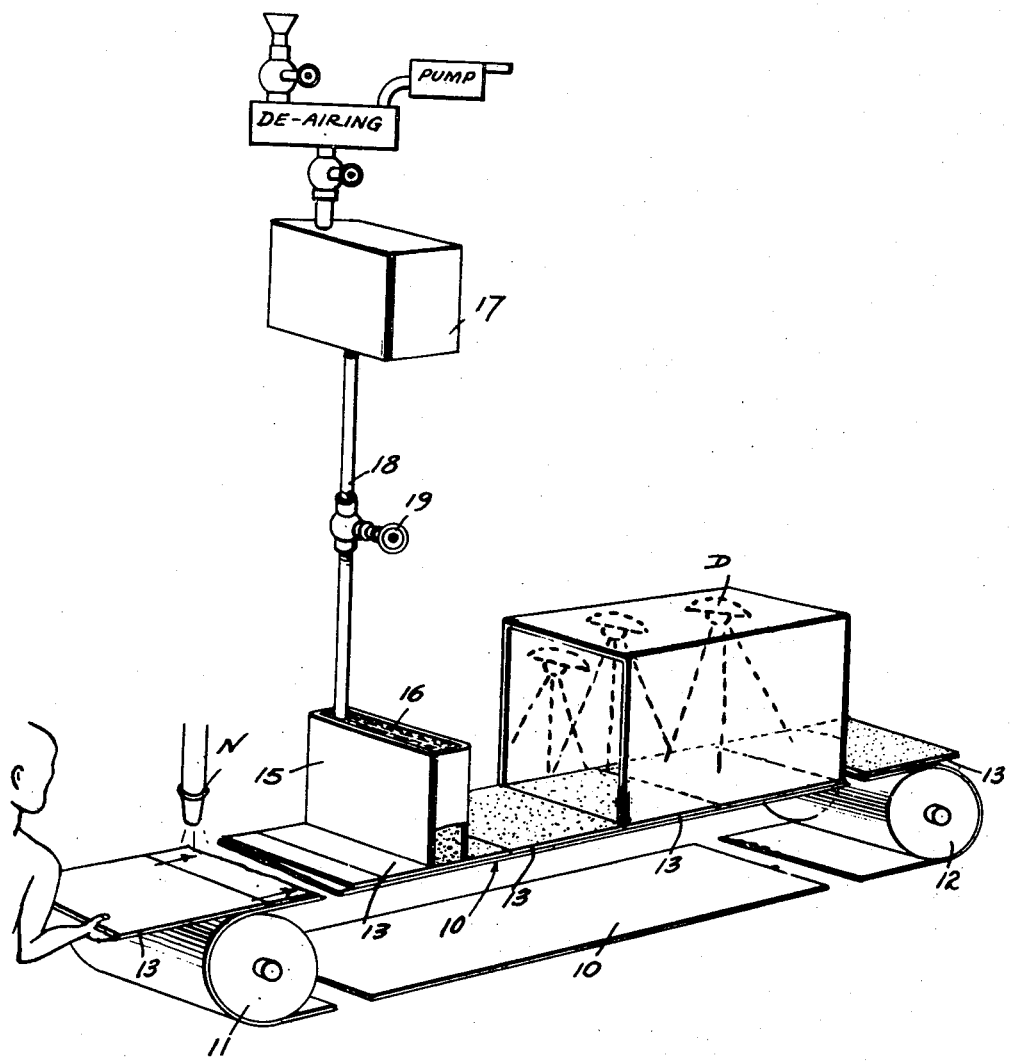
INVENTOR
GLENN N. HOWATT
BY William D Hall
ATTORNEY Patented Nov. 1, 1949

2,486,410

UNITED STATES PATENT OFFICE 2,486,410

CONTINUOUS PROCESS FOR FORMING HIGH DIELECTRIC CERAMIC PLATES

Glenn N. Howatt, Metuchen, N. J.

Application July 26, 1945, Serial No. 607,241

7 Claims. (Cl. 25—156)

(Granted under the act of March 3, 1883, as amended April 30, 1928; 370 O. G. 757)

The invention described herein may be manufactured and used by or for the Government for governmental purposes, without the payment of any royalty thereon.

This invention relates to methods for forming ceramic materials, and particularly to methods for forming ceramic materials into flat plates especially useful in the electrical and radio fields.

Heretofore, the manufacture of flat ceramic plates such as are used in the electro-chemical or radio fields was costly in that such plates were usually formed by either casting or extrusion.

My invention will take the place of extrusion of ceramic articles when a thin flat plate is required and will obviate the difficulty in such manufacture in that the extrusion of such a shape is exceedingly difficult to accomplish due to the tendency of the center of the plate to extrude more rapidly that the lateral edges and surfaces. Strains are set up in an extruded piece due to this phenomenon which causes cracks on drying and firing. Furthermore, plates produced by the prior continuous processes were undependable even if not apparently cracked, since their dielectric value was seriously impaired by striations and the like, even when their surfaces were unbroken. This difficulty will not be encountered in flat ceramic plates manufactured in accordance with my invention.

This invention is an improvement over the methods disclosed in my copending application Serial Number 554,295, filed September 15, 1944, entitled "Methods for forming flat ceramic plates" which has become abandoned.

It is an object of my invention to provide a method for forming flat ceramic plates eliminating the necessity of casting in closed or partly closed molds.

It is another object of my invention to provide a method for continuous process production of flat ceramic bodies, obviating the necessity of extrusion or like means of formation.

Another object of my invention is to provide a method for the formation of flat ceramic plates that will exhibit dielectric qualities unattainable by existing procedures and devices.

These and other objects and advantages will become apparent in the following specification when read in conjunction with the drawing in which:

The single figure is a perspective view of one embodiment of a device to carry out my invention.

In carrying out my invention a slip is made from the ceramic comminuted body using an organic binder consisting of resins and plastics such as Stabelite, Abelene, ethyl cellulose, etc., and dissolved in toluene or other similar solvent with adjusting mediums. The ceramic is added in finely divided form and the whole is ground if necessary. Alternately, water-soluble binders, such as polyvinyl alcohol, dextrin, gum gatti, sulfite liquor or other natural or artificial binders may be used with water or other suitable solvent for preparing the slip by mixing and grinding with the ceramic if necessary.

The solid binder content may be from 1 to 25%, the liquid from 99 to 75%, while the ceramic constituent will be from 1 to 10 times the weight of binder solution.

The slip is de-aired prior to its use by agitating the slip in a vacuum. If desired, the slip may be injected as a stream or streams into a vacuum for de-airing. Other known and applicable methods of de-airing ceramic slip may also be used besides those just mentioned. In the case of toluene type vehicles, boiling occurs under low pressure which must be controlled during boiling and while the pressure is increased. This boiling may be used to control the viscosity and specific gravity of the slip by removing an amount of the solvent. After de-airing, the slip is transferred to the apparatus in such a manner that bubbles will not be re-dispersed in the slip.

The prepared slip is then placed in a constant level feed hopper the lower sides of which form a rectangular opening to permit the slip or mix to flow freely therefrom. Below the feed hopper there is a moving belt or endless conveyor upon which is placed a series of bats or plaques in contiguous relation. The bats are formed of a material having an impervious surface such as glass or metal. Before the prepared slip is deposited upon the bats or plaques a parting layer of ethyl cellulose is deposited upon them by spraying or dipping them in a solution of ethyl cellulose carried in a solvent such as ethyl alcohol, methyl alcohol, etc. Other lacquer-like materials may be used instead of the ethyl cellulose parting layer used with the toluene type of slip. Vaseline, waxes, or other parting materials may be used with the toluene and water type of slip. These may be applied by spraying or by dipping the bat into a solution of the parting material. Parting layers also may be applied as decalcomanias to be dissolved off after drying.

The bats are moved by the conveyor beneath the rectangular opening of the ceramic slip feed hopper so that the slip is fed directly onto each bat or plaque. The height of the hopper feed opening above the bats determines the thickness of the ceramic plate to be formed, and the slip is continuously spread on the bats by the trailing lower edge of the feed hopper which acts as a doctor blade leaving a uniform thickness of material over the width of the bats covered by the rectangular opening in the ceramic slip feed hopper.

The ceramic slip after being deposited upon the impervious surfaces of the bats is then subjected to heat provided by a dryer of either the infra-red type or hot-air type. The thin layer of slip deposited upon the impervious bats is dried by evaporation only and none of the slip vehicle is absorbed by the impervious surfaced bat.

The drying operation loosens the bond of the parting layer for either the ceramic or impervious surface so that the ceramic proper may be removed and cut or stamped to the correct shape modified by shrinkage calculations. The firing of these parts is done in a corrective atmosphere at the correct temperatures for the properties desired. For firing, the leather-hard pieces are placed upon a setting medium of such nature that sticking is not a problem. After firing, the samples may be ground to any final size or shape desired.

Referring to the drawing in which is illustrated a device to carry out my invention, it is seen that the reference numeral 10 refers to an endless conveyor which passes around the rollers 11 and 12. Placed upon the endless conveyor belt 10 are a series of bats or plaques 13 which are in contiguous relationship to each other. As stated previously, the bats or plaques 13 are formed of a material having an impervious surface, such as glass or metal.

To prevent the slip from adhering to the impervious surface of the bats 13 a spray nozzle N is provided at the entrance side of the conveyor to apply a coating of parting material upon the surface of the bats 13 as they are placed upon the conveyor 10. As stated previously, the parting layer used may be a solution of ethyl alcohol, methyl alcohol, etc.

The slip or mix is fed by gravity from a container or hopper 15. The bottom of the hopper 15 has a rectangular opening or slot for the feed of the slip or mix 16 by gravity. The slip or mix 16 may be held at constant level in the container or feed hopper 15 by means of a barometric feed tank 17 and a feed pipe 18. The pipe 18 may be fitted with a valve 19 to control the flow of slip from the tank 17 if desired—that is, to cut off or permit flow of the slip.

As stated previously, the slip is de-aired prior to being fed into the hopper 15. This may be done by injecting a stream or streams of the slip into a vacuum. After de-airing, the slip is transferred to the hopper 15 in such a manner that air bubbles will not be present in the slip. The slip or mix is fed from the bottom opening of the slot of the hopper 15 onto the impervious surface of the bat 13. The bottom edges of the feed hopper walls act as a doctor-blade to smooth and level the slip. The thickness of the slip deposited is controlled by the viscosity of the slip, the speed of the conveyor belt, and the height of the hopper feed opening above the bat 13.

A dryer D of the infra-red type is spaced a short distance from the feed hopper 15. If desired, the dryer may be of the hot air type or any other suitable type. As the bats 13 pass through the dryer D, enough of the slip vehicle has been removed by evaporation so that the material remaining on the bat is in a condition of leather-hardness when the bat reaches the end of the conveyor. When the bats 13 reach the end of the conveyor they are removed therefrom and the material hardened to the extent stated may then be stripped off the bats 13. This drying operation loosens the bond of the parting layer for both the ceramic and impervious surfaced bat so that the ceramic proper may be removed and cut or stamped to the correct shape modified by shrinkage calculations.

After the leather-hard sheet is removed from the impervious surfaced bat it may then be placed upon a setting medium of such composition that sticking or adherence between the leather-hard sheet and the setting medium does not occur. The leather-hard product is then fired in a correcting atmosphere at the proper temperature for the properties desired. After firing, the samples may be ground to any final size or shape that may be desired. Instead of glass or metal bats 13, the slip may be fed directly onto the conveyor belt 10 which may be formed of metal such as steel, brass, copper, etc.

Further embodiments, modifications and variations may be resorted to within the spirit of the invention as set forth in the appended claims.

I claim:

1. A method of forming flat ceramic bodies, the steps comprising forming a slip by combining a ceramic material with a liquid vehicle, de-airing said slip, establishing an unconfined pool of said slip upon a support of impervious material, heating said pool of ceramic slip, removing a sufficient quantity of said vehicle by evaporation so that said ceramic material becomes leather-hard, and removing said leather-hard ceramic material from contact with said impervious material.

2. A method of forming flat ceramic bodies, the steps comprising establishing an unconfined pool of ceramic slip having a liquid vehicle upon a support having an impervious surface, removing some of the liquid vehicle from said slip by evaporation at atmospheric pressure and heating said pool of slip whereby said ceramic material becomes leather-hard.

3. A method of forming flat ceramic bodies, the steps comprising establishing a pool of ceramic slip having a liquid vehicle, supporting said pool on only one side by a solid support having an impervious surface, the remaining sides of said pool being unsupported and exposed to the atmosphere, applying heat to said pool of ceramic slip, removing some of the liquid vehicle from said slip by evaporation at atmospheric pressure whereby said ceramic material becomes leather-hard.

4. The method of claim 1 including the preliminary step of forming the slip with a binder and a vehicle which is a solvent of the binder, the binder being a material having a leather-hard quality when the solvent vehicle is evaporated to a given low content, the vehicle being initially in quantity sufficient to produce a suspension of the ceramic, and the further steps of removing the resultant material from the said support when dried to said leather-hard condition, placing the leather-hard product on a shape-preserving non-adhesive support and burning the product to a hard rigid ceramic body while on the last named support.

5. Method of forming continuously flat ceramic plates of high dielectric strength, the steps of forming a ceramic slip of high liquid content including a binder and its solvent, depositing the slip upon a flat horizontally moving support and otherwise unconfined, whereby the slip will form an unconfined pool having a uniform state of rest of the suspended ceramic throughout, maintaining the support in horizontal position and drying the deposited material to a leather-hard condition on said support, removing the leather-hard material to a non-adhesive shape-preserving support, and drying and burning the product while so supported to a hard rigid ceramic body.

6. The method of claim 5, including the step of applying a parting coat to the first named support of a nature to become freed from an adherent surface under drying of the deposited material to said leather-hard condition.

7. In the production of a flat high dielectric strength ceramic plate, forming a slip of high liquidity consisting essentially of a ceramic, a binder and a vehicle including a solvent of the binder, flowing the slip by gravity on to a flat horizontal surface so that in repose thereon it becomes a body approximating the general form of the desired plate, rendering the shaped slip leather-hard while maintained in said shape, placing the leather-hard body upon a non-adhesive support, and drying and burning the body to form a hard rigid plate.

GLENN N. HOWATT.

REFERENCES CITED

The following references are of record in the file of this patent:

UNITED STATES PATENTS

| Number | Name | Date |
|---|---|---|
| 823,232 | Thomann | June 12, 1906 |
| 1,559,498 | Brandell | Oct. 27, 1925 |
| 1,694,563 | Ross | Dec. 11, 1928 |
| 2,161,308 | Murphy et al. | June 6, 1939 |
| 2,198,621 | Izard | Apr. 30, 1940 |
| 2,266,637 | Hauser | Dec. 16, 1941 |
| 2,371,353 | Parsons | Mar. 13, 1945 |